Patented Dec. 17, 1940

2,224,987

UNITED STATES PATENT OFFICE 2,224,987

TITANIUM DIOXIDE PIGMENT AND PRINTING INK CONTAINING THE SAME

Friedrich Raspe, Leverkusen, Germany, and Robert William Ancrum, Billingham, England, assignors to Titan Company, Inc., Wilmington, Del., a corporation of Delaware No Drawing. Application July 12, 1939,
Serial No. 283,986

7 Claims. (Cl. 134—35)

This invention relates to printing inks containing titanium dioxide pigments and particularly to those inks which are especially adapted for use in off-set printing processes.

The objects of the invention include (a) printing inks containing titanium dioxide pigments, the particles of which exhibit little or no tendency to migrate out of the oleaginous ink vehicle when the ink is brought into contact with aqueous liquids, and (b) the improved titanium dioxide pigment which is substantially free from any tendency to migrate (or, in the nomenclature of the trade "to bleed" out of printing inks when the inks come into contact with aqueous liquids, as well as methods for preparing such improved pigments.

Some understanding of the principles of the offset printing process is essential for a proper appreciation of the present invention and to that end the following brief description of off-set printing is given:

In the offset printing process the design to be printed is etched upon a sheet of suitable metal such as zinc or aluminum or alloys of these metals, in such manner that the design is raised and that portion which will not print etched into the surface of the plate. The raised portions are then treated with a material which repels water leaving the depressed parts susceptible of being wet with aqueous liquids. In actual practice an inking roller passes across the surface of the plate, leaving a uniform film on the raised portions thereof. Thereafter, another roller, usually of rubber, passes across the plate, picks up the design from the plate and then prints this design. Before another passage of the inking roller across the surface of the plate, a third roller passes across the surface carrying on it a dilute acid solution. This solution is usually a very dilute solution of phosphoric acid, containing a percentage of phosphoric acid in the neighborhood of about one half to one percent. The aqueous phosphoric acid solution is repelled by the raised portions of the plate but wets the depressed portions. The purpose of this operation is to produce a slight further etching of the depressed portion, thereby to keep the outlines of the design clean and sharp and to insure a proper printing. After the acid conveying roller passes across the plate, it returns to rest immersed in the acid solution. Thereafter, the inking roller passes across the surface of the design again and the entire operation is completed. Thus, in an offset printing cycle there is:

(1) A passage of the inking roller over the metal plate;
(2) A passage of the rubber transfer roller across the plate;
(3) The passage of the acid conveying roller across the plate.

Invariably, the acid conveying roller in its passage across the plate picks up from the plate and carries back into the acid solution, small amounts of ink. Prior to the present invention, the titanium dioxide pigment particles contained in off-set printing inks, exhibited a marked tendency to migrate or "to bleed" out of the ink and into the acid solution. After a relatively short time this acid bath became contaminated with pigment particles which, in the passage of the acid conveying roller over the plate, were deposited on the design and, subsequently, carried by the transfer roller onto the printing. The resulting work would be speckled, its outlines indistinct and, in general, unsatisfactory. Thus, the great deterrent to a more general use of titanium dioxide containing printing inks in off-set printing processes was the fact that there was always encountered this objectionable migration or "bleeding" in the pigment out of the ink into the acid liquor. By means of the present invention, this objection is eliminated.

The present invention involves first the preparation of an improved type of titanium dioxide pigment and the incorporation of this improved pigment into the printing ink. The treatment of the pigment involves first a co-calcination of titanium dioxide pigment material with a small amount of antimony-oxygen compounds, e. g., antimony oxide or compounds of antimony which on calcination yield antimony-oxygen compounds, followed by a treatment of this antimony containing titanium dioxide pigment with alumina. Titanium dioxide pigments are generally manufactured at the present time by a process which involves the following essential steps:

(a) Digestion step, wherein the titaniferous ore, ilmenite, is reacted with sulphuric acid to form a water soluble sulphated digestion cake.

(b) This cake is dissolved in an aqueous liquid, filtered and subjected to a reducing treatment.

(c) A portion of the iron sulphate content, contained therein, may be removed by cooling and crystallization.

(d) The resulting solution is subjected to hydrolysis by heating, thereby to precipitate hydrous titanium oxide.

(e) The hydrous titanium oxide is washed and calcined; the calcined product is then pulverized and ready for use.

The amount of antimony to be employed should be such that after calcination an amount of antimony compound between about 0.1 percent and 10.0 percent calculated as $Sb_2O_3$ based on the weight of titanium dioxide, calculated as $TiO_2$, will be present in the calcined pigment. A preferred amount is about 1.0 percent.

After calcination of the antimony-containing titanium dioxide pigment the alumina treatment may follow any convenient technique. Thus, (1) the pigment may be suspended in a water solution of a soluble aluminum salt, e. g., aluminum sulphate, and an alkaline-reacting compound, e. g., ammonia, alkali metal hydroxides, carbonates and the like added thereto to precipitate aluminum hydroxide on the pigment particles; (2) the pigment particles may be suspended in an aluminate solution, e. g., a sodium aluminate solution, and allowed to remain in contact therewith until a sufficient amount of aluminum, as aluminate ion has been adsorbed by the pigment particles; (3) the pigment particles may be suspended in an aluminate solution as under (2) and hydrous aluminum oxide precipitated on the pigment particles by adding to the suspension an acid-reacting reagent, such as hydrochloric acid; (4) separately prepared aluminum hydrate may be intimately mixed with the pigment particles, preferably by mixing in an aqueous slurry of the pigment particles with the aluminum hydroxide and subsequently drying and pulverizing the mixture.

The improved titanium dioxide pigments of the present invention may be prepared by incorporating the antimony compound with the titaniferous material at any stage prior to calcination. For instance, it may be mixed with the titaniferous ore prior to digestion with sulphuric acid; it may be added, either as a solid or in the form of an aqueous solution of a water-soluble antimony compound to the titanium solution prior to or during hydrolysis or it may be admixed with the precipitated hydrous titanium oxide prior to calcination. In some cases, if desired a previously calcined titanium dioxide pigment may be admixed with antimony compound and the mixture recalcined.

The particular chemical composition of the antimony compound is not of any considerable importance in the practice of the invention. Antimony ores, water-soluble or water-insoluble antimony compound, antimony oxides may be equally employed. To some extent the stage at which the antimony compound is to be added will dictate the type of antimony compound to be employed. For instance, antimony ores, e. g., stibnite, and water-insoluble compounds are best to add at the digestion step; water-soluble antimony compounds and antimony oxides are preferable to add prior to or during the hydrolysis, and antimony oxides and compounds of antimony which on calcination yield antimony-oxygen compounds are to be preferred for admixture with the hydrous titanium oxide.

The quantity of aluminum to be added to the antimony pigment should be between about 0.2 percent and 5.0 percent, calculated as $Al_2O_3$ on the weight of titanium dioxide, calculated as $TiO_2$, in the pigment. A preferred amount is about 1.0 percent.

When the pigment has been treated in the manner of the invention the ink may be made in any convenient manner. For instance, the treated pigment may be incorporated into the usual lithographic varnishes which are employed as printing ink bases. Such mixing is ordinarily accomplished by mixing on standard grinding rollers. The composition of the ink base does not have to be altered in any way because of the addition of the treated pigment. The lithographic varnishes from which printing inks are made are of the oleo-resinous variety in which a resin, either synthetic or natural is dissolved in an air-drying vegetable oil. The pigments of the present invention are adopted for use with all present types of oleo-resinous printing ink bases.

The following examples will serve to illustrate for those skilled in the art various ways of employing the present invention which is not limited to the preparation of white inks but colored ones as well, as will be shown.

*Example I*

Hydrous titanium oxide is prepared in the usual manner by hydrolysis of a titanium sulphate solution. A quantity of this precipitated hydrous titanium oxide, containing 10 kilograms of titanium, calculated as $TiO_2$, is intimately mixed with 100 grams of antimony trioxide and the mixture calcined in the usual manner. The resultant calcined pigment is pulverized and then slurried with water to form a slurry containing about 20 percent solids. A 10 percent solution of aluminum sulphate equivalent to 1 percent $Al_2O_3$ on a $TiO_2$ basis is added thereto. Ammonia is next added in an amount calculated to precipitate on the pigment particles aluminum hydroxide to about 1 percent of the weight of the pigment, calculated as $Al_2O_3$. After settling, the so-treated pigment is separated from the supernatant liquor, washed, dried and pulverized.

The pigment treated with antimony and aluminum as described above is then incorporated into a lithographic varnish on the usual ink grinding roller mills. The resulting ink is eminently adapted for use in offsetting printing processes. It is white in color and the pigment particles thereof exhibit substantially no tendeny to "bleed" out of the varnish vehicle of the ink when employed in such a process.

*Example II*

A sufficient amount of antimony trioxide is added to a titanium sulphate solution to yield, after the solution is hydrolyzed, a mixture of hydrous titanium oxide and antimony, calculated as $TiO_2$ and $Sb_2O_3$ respectively, of 98 percent $TiO_2$ and 2 percent $Sb_2O_3$. The mixture is calcined and thereafter pulverized. After pulverization the pigment particles are suspended in a sodium aluminate solution and a sufficient amount of dilute hydrochloric acid added thereto to precipitate upon the suspended pigment about 1.5 percent aluminum, calculated as $Al_2O_3$, based on the weight of pigment particles suspended in the solution. When the so-treated particles have settled, they are removed by filtration from the supernatant liquor, washed, dried and pulverized.

After pulverization they are incorporated in an oleo-resinous lithographic ink varnish together with a sufficient amount of orange colored lake pigment to produce a desired orange colored ink, the pigment particles of which exhibit substantially no tendency to "bleed" when the ink is employed in off-set printing processes.

Example III

A previously prepared calcined pigmentary titanium dioxide is mixed with 100 grams antimony trioxide and the mixture heated to 900° C. for about one hour. The so-treated pigment is intimately mixed with aluminum hydroxide in an amount sufficient to yield about 1 percent aluminum, calculated as $Al_2O_3$, by milling in a ball-mill in the form of an aqueous slurry. After de-watering and pulverization the so-produced pigment is incorporated with a lithographic ink base in the usual way.

In the foregoing examples the antimony compound employed was antimony trioxide. This compound most readily lends itself to the practice of the present invention, but it will be understood that other antimony compounds, such as the water-soluble compounds, may be added to the titanium sulphate solution, and such antimony compounds as decompose on calcination to form antimony-oxygen compounds may be mixed with the precipitated hydrous titanium oxide prior to calcination.

The invention is not limited, therefore, to the use of any special antimony compound or aluminum compound, but embraces a calcination of titanium oxygen compounds in admixture with a small amount of antimony-oxygen compound or such other antimony compound as yields an antimony-oxygen compound on calcination, followed by a coating of intimate admixture of an aluminum oxygen compound. The conjoint effect of the two treatments being to produce a pigment especially suitable for the preparation of inks for off-set printing processes, the pigment particles of which exhibit substantially no tendency to "bleed" and migrate out of the printing ink base.

The application of the treatment of the pigment is not limited to pigmentary titanium dioxide, but embraces also composite titanium pigments which are those having intimately associated with the titanium dioxide thereof an extender pigment, such as barium sulphate, calcium sulfate, calcium carbonate, silica, magnesium silicate, etc.

The foregoing description of our invention is given for clearness of understanding and no undue limitation should be deduced therefrom, but the appended claims should be construed as broadly as possible in view of the prior art.

We claim:

1. A substantially "non-bleeding" printing ink comprising an oleaginous printing ink vehicle having dispersed therein particles of a calcined titanium dioxide pigment prepared by a conjoint calcination of titanium dioxide and a compound selected from the group consisting of antimony oxides and compounds which on calcination yield antimony oxide and a subsequent treatment in aqueous media with hydrated aluminum oxide.

2. A substantially "non-bleeding" printing ink comprising an oleaginous printing ink vehicle having dispersed therein particles of a calcined titanium dioxide pigment prepared by a conjoint calcination of titanium dioxide and a compound selected from the group consisting of antimony oxides and compounds which on calcination yield antimony oxide, the amount of antimony in the calcined product, calculated as $Sb_2O_3$, being between about 0.1 percent and 10 percent based on the $TiO_2$ content, and a subsequent treatment in aqueous media with hydrated aluminum oxide in an amount between about 0.2 percent and 5.0 percent, calculated as $Al_2O_3$, based on the $TiO_2$ content.

3. A substantially "non-bleeding" printing ink comprising an oleaginous printing ink vehicle having dispersed therein particles of a calcined titanium dioxide pigment prepared by a conjoint calcination of titanium dioxide and a compound selected from the group consisting of antimony oxides and compounds which on calcination yield antimony oxide, the amount of antimony in the calcined product, calculated as $Sb_2O_3$, being about 1.0 percent, and a subsequent treatment in aqueous media with hydrated aluminum oxide in an amount of about 1.0 percent, calculated as $Al_2O_3$, based on the $TiO_2$ content.

4. A printing ink according to claim 1 in which the antimony and alumina-treated pigment used is a composite titanium dioxide pigment.

5. An improved titanium dioxide pigment comprising particles of titanium dioxide pigment conjointly calcined with antimony oxide and treated in aqueous media subsequent to the calcination with hydrated aluminum oxide.

6. An improved titanium dioxide pigment comprising particles of titanium dioxide conjointly calcined with antimony oxide, the latter in an amount calculated as $Sb_2O_3$ between about 0.1 percent and 10.0 percent, based on the $TiO_2$ content, and treated in aqueous media subsequent to the calcination with hydrated aluminum oxide in an amount calculated as $Al_2O_3$ between about 0.2 percent and 5.0 percent, based on the $TiO_2$ content.

7. An improved titanium dioxide pigment comprising particles of titanium dioxide conjointly calcined with antimony oxide, the latter in an amount calculated as $Sb_2O_3$ about 1.0 percent, based on the $TiO_2$ content, and treated in aqueous media subsequent to the calcination with hydrated aluminum oxide in an amount calculated as $Al_2O_3$ about 1.0 percent, based on the $TiO_2$ content.

FRIEDRICH RASPE.
ROBERT WILLIAM ANCRUM.